(12) United States Patent
Dhaene

(10) Patent No.: US 9,432,333 B2
(45) Date of Patent: Aug. 30, 2016

(54) TRUSTED CONTENT DISTRIBUTION SYSTEM

(75) Inventor: Christophe Dhaene, Ieper (BE)

(73) Assignee: E-BO ENTERPRISES, Ieper (BE)

( * ) Notice: Subject to any disclaimer, the term of this patent is extended or adjusted under 35 U.S.C. 154(b) by 43 days.

(21) Appl. No.: 13/636,825

(22) PCT Filed: Mar. 24, 2011

(86) PCT No.: PCT/EP2011/054574
§ 371 (c)(1),
(2), (4) Date: Dec. 4, 2012

(87) PCT Pub. No.: WO2011/117370
PCT Pub. Date: Sep. 29, 2011

(65) Prior Publication Data
US 2013/0074165 A1  Mar. 21, 2013

(30) Foreign Application Priority Data

Mar. 24, 2010 (EP) .................................. 10447010

(51) Int. Cl.
*G06F 7/04* (2006.01)
*H04L 29/06* (2006.01)
*G06F 21/34* (2013.01)

(52) U.S. Cl.
CPC ............ *H04L 63/0272* (2013.01); *G06F 21/34* (2013.01); *H04L 63/0815* (2013.01)

(58) Field of Classification Search
CPC ...... G06F 21/305; G06F 21/74; H04L 9/3234
USPC ............ 726/5, 6; 713/156, 158; 709/220–223
See application file for complete search history.

(56) References Cited

U.S. PATENT DOCUMENTS

| 7,085,805 | B1 * | 8/2006 | Ruberg ................. G06F 9/5055 709/203 |
| 7,457,878 | B1 * | 11/2008 | Mathiske ................ H04W 4/02 709/227 |
| 7,607,174 | B1 * | 10/2009 | Kashchenko et al. .......... 726/25 |
| 7,971,071 | B2 * | 6/2011 | Walkoe et al. ................ 713/193 |
| 8,214,505 | B2 * | 7/2012 | Jagadeeswaran et al. .... 709/227 |
| 8,214,885 | B2 * | 7/2012 | Blaisdell ........................ 726/5 |
| 8,266,688 | B2 * | 9/2012 | Borzycki .............. H04L 63/166 709/229 |

(Continued)

FOREIGN PATENT DOCUMENTS

WO  2009064406  5/2009

OTHER PUBLICATIONS

Manabu Hirano, Two-step Execution Mechanism for thin secure hypervisors, Jun. 2009, vol. 4, pp. 129-135.*

(Continued)

*Primary Examiner* — Dede Zecher
*Assistant Examiner* — Viral Lakhia
(74) *Attorney, Agent, or Firm* — Banner & Witcoff, Ltd.

(57) ABSTRACT

A trusted content distribution system is described comprising a trustworthy enduser device and a network management infrastructure, the enduser device being adapted for communications between the enduser device and the networked infrastructure via a secure tunnel; the end user device comprising a host processor and memory; secure non-volatile memory for storing an operating system, a trusted boot process executed by the host processor to boot the end user device into a known state, means for communicating with a visualization device.

15 Claims, 6 Drawing Sheets

(56) References Cited

U.S. PATENT DOCUMENTS

| | | | | |
|---|---|---|---|---|
| 8,281,375 B2* | 10/2012 | von Krogh | | 726/6 |
| 8,359,646 B2* | 1/2013 | Suffern et al. | | 726/22 |
| 8,621,204 B2* | 12/2013 | Edstrom et al. | | 713/156 |
| 8,806,609 B2* | 8/2014 | Gladstone | | H04L 9/085 713/171 |
| 8,856,300 B2* | 10/2014 | de los Reyes | | H04L 63/20 709/203 |
| 8,892,600 B2* | 11/2014 | Kenworthy | | H04L 63/0209 707/705 |
| 8,938,793 B2* | 1/2015 | Ausems | | G06Q 20/0453 713/153 |
| 8,984,610 B2* | 3/2015 | Spiers | | H04L 63/0218 726/22 |
| 9,063,691 B2* | 6/2015 | Husain | | G06F 3/14 |
| 9,178,697 B2* | 11/2015 | Gladstone | | H04L 9/085 |
| 2003/0014476 A1* | 1/2003 | Peterson | | 709/203 |
| 2003/0023679 A1* | 1/2003 | Johnson et al. | | 709/204 |
| 2005/0198532 A1* | 9/2005 | Comlekoglu et al. | | 713/201 |
| 2007/0266439 A1* | 11/2007 | Kraft | | 726/26 |
| 2008/0201454 A1* | 8/2008 | Soffer | | 709/220 |
| 2008/0281953 A1* | 11/2008 | Blaisdell | | 709/223 |
| 2009/0063685 A1* | 3/2009 | Common | | 709/227 |
| 2009/0319782 A1* | 12/2009 | Lee | | 713/156 |
| 2011/0154026 A1* | 6/2011 | Edstrom et al. | | 713/158 |
| 2012/0084545 A1* | 4/2012 | Farina | | G06F 21/575 713/2 |
| 2012/0317182 A1* | 12/2012 | Husain et al. | | 709/203 |

OTHER PUBLICATIONS

International Search Report and Written Opinion dated Sep. 20, 2011, issued for corresponding PCT Application No. PCT/EP2011/054574.

International Preliminary Report on Patentability dated Oct. 22, 2012, issued for corresponding PCT Application No. PCT/EP2011/054574.

* cited by examiner

TRUSTED CONTENT DISTRIBUTION SYSTEM

RELATED APPLICATION DATA

This application is a National Stage Application under 35 U.S.C. 371 of co-pending PCT application PCT/EP2011/054574, designating the United States and filed Mar. 24, 2011, titled "Trusted Content Distribution System", which claims the priority benefit of EP Patent Application No. 10447010.9, filed Mar. 24, 2010, titled "Trusted Content Distribution System", the entire disclosure of each of which is hereby incorporated by reference for all purposes.

The present invention relates to system and method for trusted authentication onto a data system as well as to a system and method for trusted distribution of content such as voice, data, video etc. It also relates to strong authentication devices such as USB sticks.

BACKGROUND OF THE INVENTION

Various schemes have been provided to allow access to a remote computer such as a server or a data center by logging in. Many of these schemes suffer from security problems. Security issues can be generated by viruses such as keystroke loggers, port or network sniffers, trojans, LAN analyzers, data scopes, ASCII start-stop monitoring or by persons hacking.

Security schemes are often characterised by the number of security elements that are required to obtain log-in, e.g. a smartcard, a PIN, etc. Such elements can be logical (such as a PIN) or physical (like a smartcard). Logical security elements such as a PIN can be detected by keystroke loggers or by "over the shoulder" observation. Hence system that combine logical and physical security elements are preferred. One issue is how to make use of physical elements such as smartcards, USB flash memories and the like in an optimum way.

SUMMARY OF THE INVENTION

The present invention relates to a method for providing for a user a secure connection between a first electronic device and a second electronic device over a communication network that may be insecure and that connects the first and second electronic device, the secure connection being used for exchanging data, whereby said first electronic device, comprises:
  a human machine interface such as visualization means; and
  at least one communication port
whereby said second electronic device is adapted for storing, controlling and executing applications and storage of data and administrating the secure connection,
whereby a third user specific electronic device such as a USB stick is used, the third user specific electronic device comprising
  memory, storing user identification information; and
  an initialization module
the method comprising the step of:
connecting the first electronic device with a third user specific electronic device via the communication port;
initializing and managing by said third electronic device the operation of the first electronic device for setting-up a secure connection over said communication network with the second electronic device; and
managing every interface of the first electronic device and optionally the secure connection from the second electronic device.

The method can include receiving over the secure connection user identification information and based thereon to authenticate the user, the administrating including allowing or denying access to data and/or applications under the control of the second electronic device based on security settings of the authenticated user.

Also in the method, after establishing the secure connection, further steps can be: executing the application under the control of the second electronic device while exchanging the content over the secure connection for presentation to the user via a human machine interface of the first electronic device.

The present invention provides a trusted content distribution system for providing for a user a secure connection between a first electronic device and a second electronic device over a communication network that may be insecure and that connects the first and second electronic device, the secure connection being used for exchanging data, said first electronic device comprising:
  a human machine interface such as visualization means; and
  at least one communication port
whereby said second electronic device is adapted for storing and executing applications and storage of data and administrating the secure connection,
whereby a third user specific electronic device such as a USB stick is used, the third user specific electronic device comprising
  memory, storing user identification information; and
  an initialization module
the system further comprising:
the at least one communication port being adapted for connecting the first electronic device with a third user specific electronic device;
means for initializing and managing by said third electronic device the operation of the first electronic device for setting-up a secure connection over said communication network with the second electronic device; and
means for managing every interface of the secure connection and the first electronic device from the second electronic device.

The means for administrating can comprise an appliance box communicating with the enduser device over a secure tunnel. The appliance box can comprise a proxy component and a management component.

The appliance box can be provided with any of network connectivity, Support and Maintenance at boot time, a Web-enabledManagement Console.

Optionally the first electronic device can be adapted to provide one or more authentication mechanisms to access content that is centralized on the communication network. Also the first electronic device can be adapted to use one or both logical and physical access control.

A client operating system can run either natively or virtually on the first electronic device. The first electronic device can be adapted for Single Sign-On. For example, the first electronic device can be adapted to use a strong authentication medium.

The means for initializing can be a trusted boot process that boots an operating system in a random access memory of the first electronic device.

The first electronic device is preferably adapted for receiving over the secure connection the user identification information and based thereon to authenticate the user, the means for managing every interface being adapted to allow or deny access to data and/or applications under the control of the second electronic device based on security settings of the authenticated user.

The second electronic device can be adapted to control execution of an application while exchanging content over the secure connection for presentation to the user via the human machine interface of the first electronic device.

In embodiments of the present invention a trusted content distribution system is provided which comprises a trustworthy enduser device and a network management infrastructure, the enduser device being adapted for communications between the enduser device and the networked infrastructure via a secure tunnel; the end user device comprising
a host processor and memory,
secure non-volatile memory for storing an operating system, a trusted boot process executed by the host processor to boot the end user device into a known state, and
means for communicating with a visualisation device.

In order to prevent or control any unauthorised access to the system the networked infrastructure comprises an appliance box communicating with the enduser device over the secure tunnel. The appliance box is able to control the operation of the enduser device such as to open or close any port, to activate or deactivate any driver etc.

In embodiments the appliance box comprises a proxy component and a management component. The appliance box is provided with any of Network Connectivity, Support and Maintenance at boot time, a Web-enabled Management Console.

The end user device is adapted to allow one or more authentication mechanisms to thereby gain access content that is centralized on the network management infrastructure.

The enduser device can be adapted to use one or both of logical and physical access control.

The client operating system can run either natively or virtually on the client hardware.

The enduser device can be adapted for Single Sign-On. The end user device can be adapted to use a strong authentication medium.

In the enduser device the trusted boot process boots an end user device operating system in a random access memory of the enduser device.

In embodiments of the present invention a method for establishing a trusted content distribution system between a trustworthy end user device and a networked infrastructure is provided, the end user device and networked infrastructure communicating over a secure tunnel,
whereby the end user device comprises:
  a host processor;
  a visualisation device; and
  a communication port
whereby the networked infrastructure, being adapted for storing and executing applications and content,
whereby a third strong authentication means such as a USB stick, a mobile phone with SIM card, a smartcard etc., e.g. storing user specific data, is used, the third means comprising a means with a trusted boot process
the method comprising the step of:
connecting the end-user device with the third means via a communication port boot the end user device by executing the trusted boot process by the host processor of the end user device thereby setting up a secure tunnel between the end user device networked infrastructure
providing authentication information over the secure tunnel to the networked infrastructure to thereby control access by the user to content assigned to the user and centralised on the networked infrastructure.

In embodiments of the present invention this method includes
establishing the trusted content distribution system; and executing the application essentially on networked infrastructure while exchanging the data over the secure tunnel for display to the user via a visualisation device.

The present invention also provides a user specific electronic device e.g. bootable such as a USB stick comprising:
  memory, storing user identification information; a first communications port and an initialization module
the user specific electronic device having means for initializing and managing the operation of a further electronic device for setting-up a secure connection over a communication network with a third electronic device for trusted content distribution using a secure connection between the further electronic device and the third electronic device, the secure connection being used for exchanging data, said further electronic device comprising:
  a human machine interface such as visualization means; and
  at least one second communication port, the at least one second communication port being adapted for connecting the user specific electronic device to further electronic device.

Embodiments of the present invention has one or more of the following technical features. The system provides the use with Identification with a login box, a hardware key or automatic authentication. Single Sign-On can be provided. End-to-end security can be provided. For additional security client device authentication can be provided down to any level that is required, i.e. down to port authentication all operated by the central control. Generally there is LAN, WAN and Internet transparency. A particular advantage of embodiments of the present invention that only a zero client is required. This places very low requirements on the client device and allows easy activation for homeworking as no extra software or hardware is needed. This means that existing client hardware and peripherals can be used/reused. For good security there is state control and power management on the client hardware. By supplying content from a centralised management system, the operating systems and applications used in the data center can be managed in that center and there is little management required at the client device. The data center includes cloud computing. Hence content brokering is simplified for different systems, e.g. for Windows and Linux environments on physical or virtual servers. Automated failover and fallback can be provided as the data and context is kept in the data center and not at the client device. Hence failover and fallback is more secure. A further advantage is that multiple environments can be assigned to one user. Handling can be provided for serial ports such as usb peripheral devices. However as each interface, e.g. port or driver is controlled, e.g. logged centrally, the usage of peripherals is determined and assigned as user rights. This control includes for example, that printing support can be provided on parallel, usb and tcp-ip interfaces. In embodiments a web-enabled management console is provided and the management can include workspace management such as logging, auditing and alerting, screen takeover and realtime monitoring. All events can be propagated via any suitable protocol such as SNMP. Standard features can include automatic ticket generation, classification and grouping of tickets and reporting.

Content distribution includes voice such as VoIP softphone being available on all client hardware as well as video, there can be integration with all SIP enabled VoIP centers, Desktop and Phone As a Service. Hot desking can be provided. The system provides mobility as the data is stored centrally. Single Sign-On can be provided.

DESCRIPTION OF THE PREFERRED EMBODIMENTS

The present invention relates to a security platform that facilitates the centralization of all content types such as data, programs, applications, voice, video, graphics, games etc. It can include any of Identity and Access management, Asset management, Brokering and Failover, Peripheral support, Helpdesk and Ticketing, Video streaming, VoIP or combinations of these. Modules can be provided for multi-monitoring and education purposes.

Figure 1:
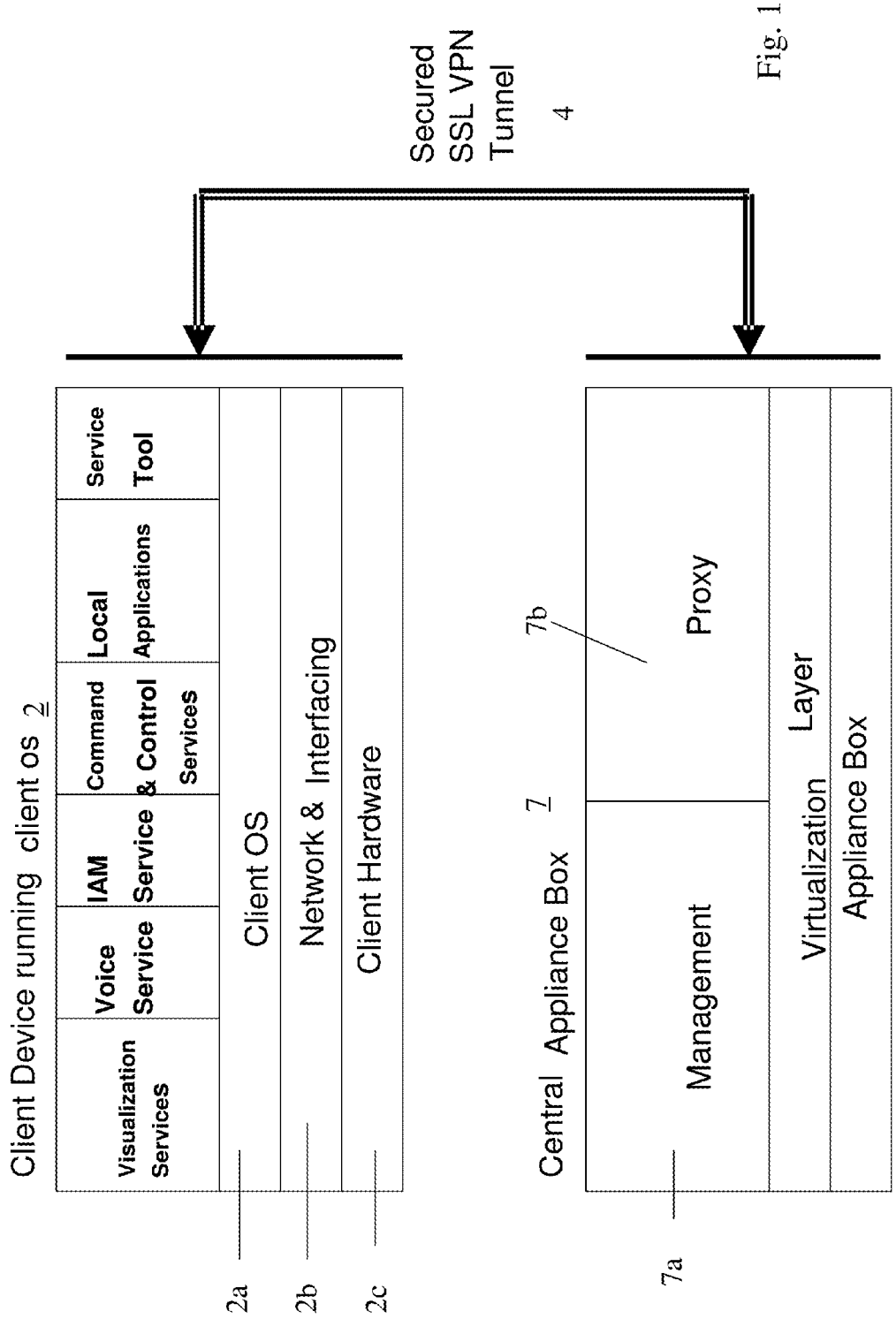
FIG. 1 shows protocol layers in accordance with an embodiment of the present invention.

As shown in FIG. 1 an Appliance Box 7 is provided e.g. in a centralized data center that can cooperate with any virtualization technology such as VMware, Hyper-V, Citrix or other.

Figure 2:
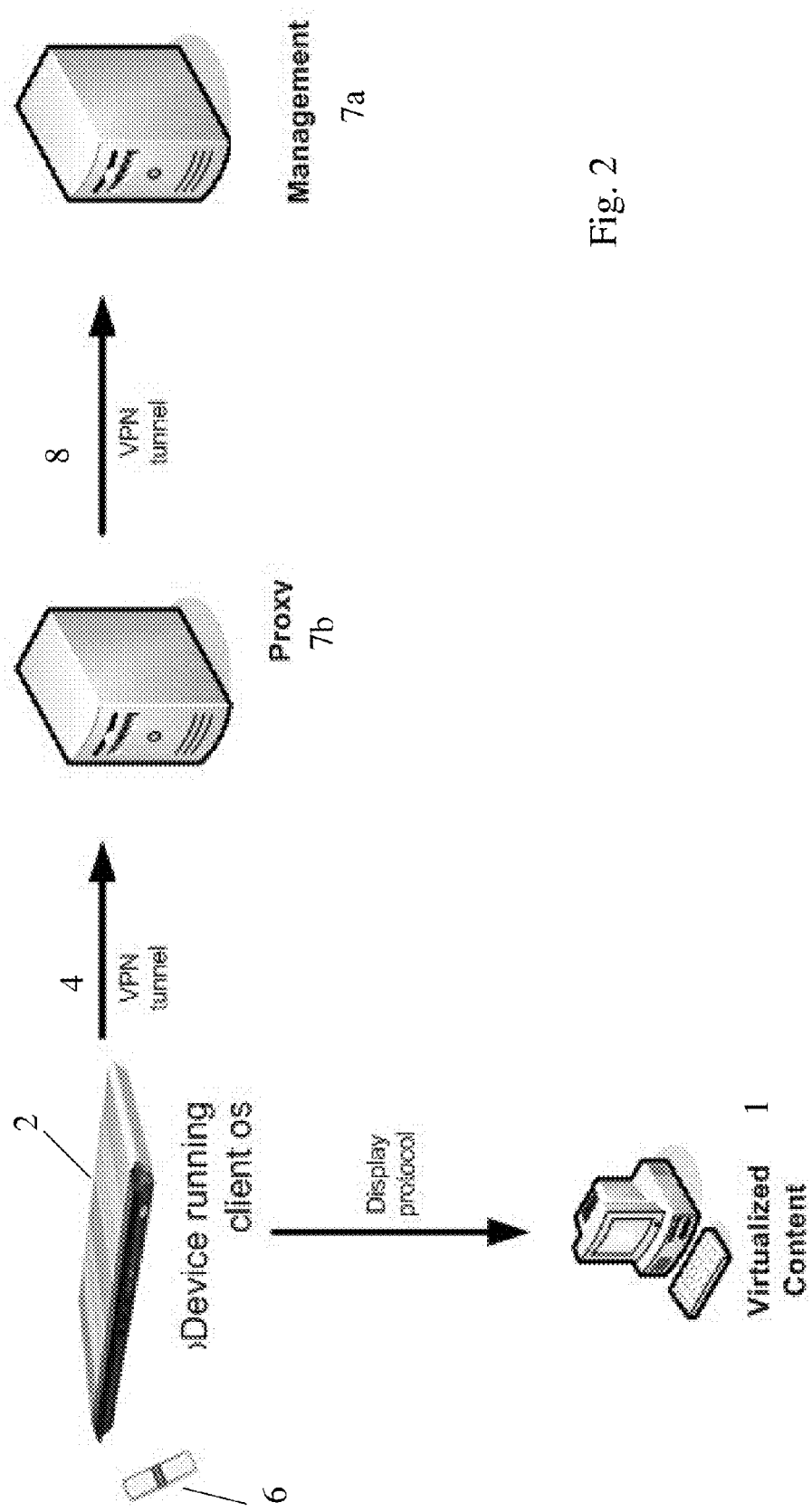
FIG. 2 shows a system for trusted distribution of content in accordance with an embodiment of the present invention.

As shown in FIG. 2 a user having user equipment, i.e. a client device 2 can use one or more authentication mechanisms to access content that is centralized. Both logical and physical access control can be used. The identification and authentication occurs against the client operating system 2a running on the client device, which is initialised or booted on 'trusted' client hardware 2c. The client operating system runs either natively or virtually on the client hardware 2c. The client can be a thin-client but is preferably a zero-client. Single Sign-On can be fully supported and a strong authentication medium can be used such as a USB identification stick. Other authentication media may be used in conjunction with the primary strong authentication medium, such as smartcards, biometric devices or information, mobile phones with a SIM card, flash memories etc. Also third party authentication schemes can also be included but every additional need for a separate connection opens up the possibility that such a connection is insecure. Hence, it is preferred if authentication is carried out within the network between the client and the centralized data center without going outside this network.

As shown in FIGS. 1 and 2 a user can interact with the centrally located content from anywhere allowing access to the centralized content, e.g. from anywhere on a data network such as a LAN, WAN, for example the Internet. The platform provides a content delivery and distribution system which can handle all content such as programs, data, video, graphics and voice communications in a secured way on a network such as a LAN, WAN and Internet. It provides end-to-end security. The platform has the advantages of flexibility for the end-user, decreasing the operational costs on several levels: local cabling, field service, network connectivity, desktop management, phone invoices, deployment and roll-outs. The client device 2 has an ability and a means 1 (or can be adapted to communicate with other peripherals such as printers, displays, etc so as) to display content, for example, to print, to project onto a screen, to display on a video display unit or for any other form of display. Means for printing or other forms of visualisation such as projection are examples of human machine interfaces.

The present invention does not need virtual machines to be executed on the client device, e.g. to host local applications or to host operating systems. Thus, the client device does not need to host virtual machines that host operating systems, the operating systems hosting applications. Thus, the client can be a zero-client.

The platform contains all functionality for efficient IT management. The roll-out of IT is simplified, providing flexibility and scalability to cope with the on-demand business requirements. The platform can be provided as an open system which integrates with the following non-exhaustive list: Active Directory, VMware, SIP, VASCO and many others.

A computer-based management element such as the Appliance Box 7 hosts central software components. It is preferably scalable, e.g. from 1 to 500 users. Preferably it resides in a server room or a datacenter. The Appliance Box 7 is a host platform for several functional components, e.g.:
Functional Components # Description
A Central Management system (7a),
A proxy for all network an security services (7b),
Network connectivity,
Support and Maintenance at boot time,
A Web-enabledManagement Console.

Network interfaces such as Ethernet interfaces for support and maintenance purposes residing typically in a separated management vlan can be provided. One interface can be for connecting a remote access card at boot time. Another interface can be for connecting a hardware appliance, which hosts several logical entities with ipconnectivity.

Other networks, e.g. WiFi, UMTS, GSM, Ethernet interfaces are functional interfaces for a management console and for one or more proxies. Each is able to manage a number of users such as 100 users. Optionally, the platform can be configured in a redundant setup, meaning that two Appliance Boxes 7 are configured in high availability mode.

The system and methods of the present invention provide one or more authentication mechanisms. For physical access control a physical key such as a USB stick 6 can be used as a strong authentication medium.

The client device 2 has a processor and memory and runs an operating system 2a. The operating system 2a has a limited footprint such as 300 MB and can run natively or virtually. Each time a client device 2 starts the client operating system 2a is loaded into memory. The RAM of the client device 2 is preferably larger than the footprint. The client operating system 2a can be provided by the strong authentication medium such as a USB Identification Stick 6 or via an onboard memory such as a flash memory. There is no need to use harddisks and in accordance with an important aspect of the present invention all interfaces like ports such as usb, audio, video and serial ports, or drivers such as display drivers or input drivers such as keyboard drivers can be managed by a central management console. This means that interfaces such as ports and drivers on the client device are totally under the control of the central management console. Any attempt to hack into the system and, for example, to open a port can be detected by the central management console and can be prevented. Thus the secure tunnel is a conduit for the management console in the data center to control the interfaces on the client device and also on the tunnel itself.

The system described above differs from systems that use USB sticks to transfer context from one computer to another. So for example files may be stored on a USB sticks and can be viewed on any computer using the USB stick. In the system described above the content is located at the data center and the central management console arranges for display, e.g. visualisation at the client device. Means for visualisation are one example of a human machine interface.

A Proxy 7b resides as functional component in the central Appliance Box 7. A proxy instance is performing tasks for the management console which is part of the management system. Each proxy is securely connected to the management system. All network and security services are fulfilled by the proxy. All communication from and to the client operating system 2a happens through a proxy 7b. This proxy component provides the scalability in the platform. As many proxies can be provided as are necessary to serve the user population. Preferably, there is only one management system.

Figure 3:
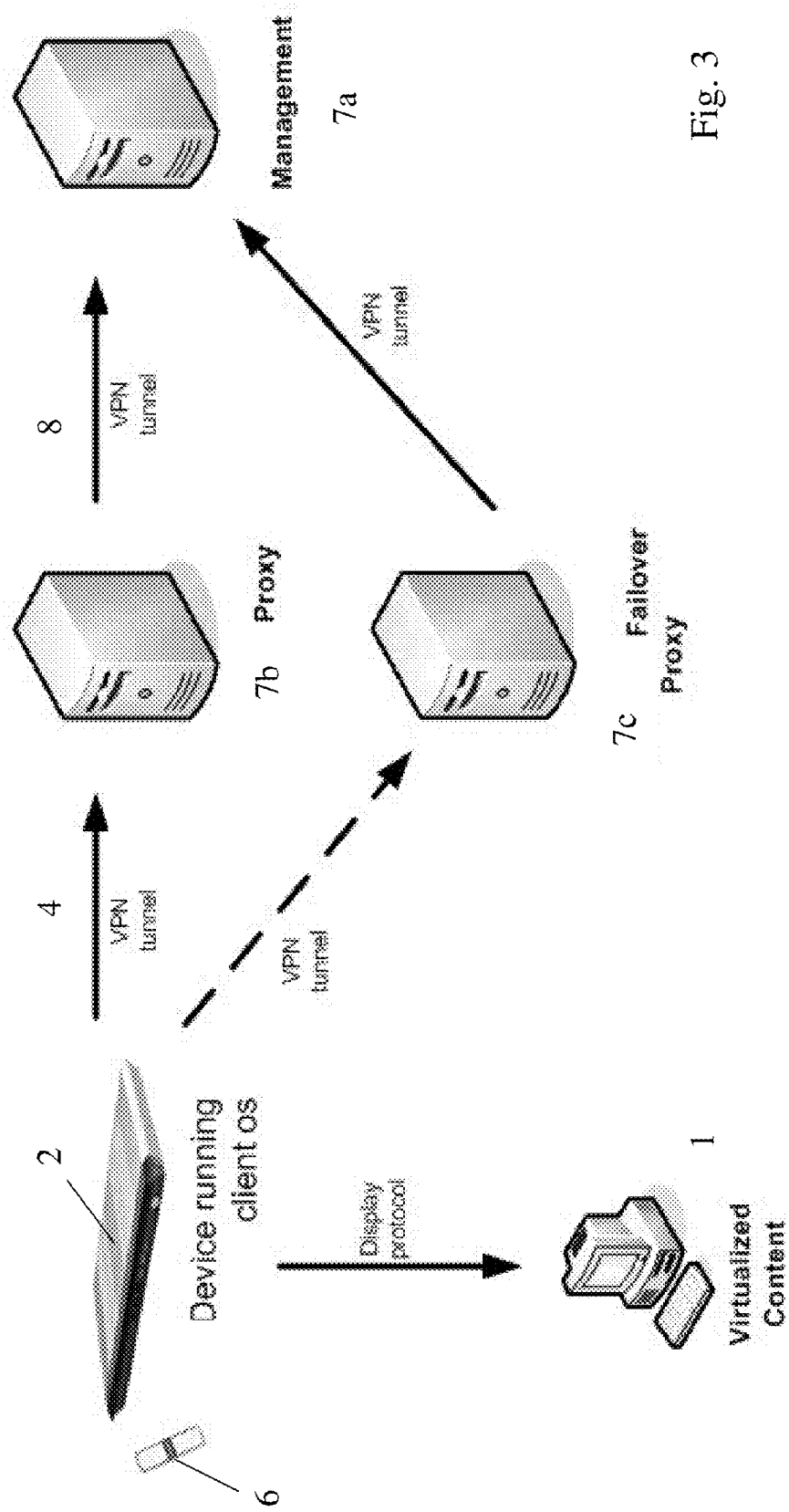
FIG. 3 shows a system for trusted distribution of content with failover in accordance with an embodiment of the present invention.

As shown in FIG. 3 each proxy 7b can optionally be configured in a redundant setup, meaning that a proxy 7b can have a fallback or backup proxy 7c. The backup proxy 7c can take over all activities of the original proxy 7b. Also fallback to the original proxy is implemented. If a failover of a proxy happens, then the connected users will be notified that a failover is going on, but the users do not have to do anything.

The centralized management console or instance controls any action taken in the whole platform. This is to be understood as control of all interfaces such as drivers and ports. All business logic, all rights 'who may see what' or 'which services a client operating system has to perform' is concentrated in only one system, namely the management console. Anything that should be modified, created, deleted, activated or deactivated, assigned, etc. . . . is configured in the management console. The management console determines the behaviour of the whole system.

Each Appliance Box 7 has the ability to configure only one Management system. If there are several Appliance Boxes 7 with the possibility to activate several Management instances, then only one Management instance is enough to setup the platform.

Figure 4:
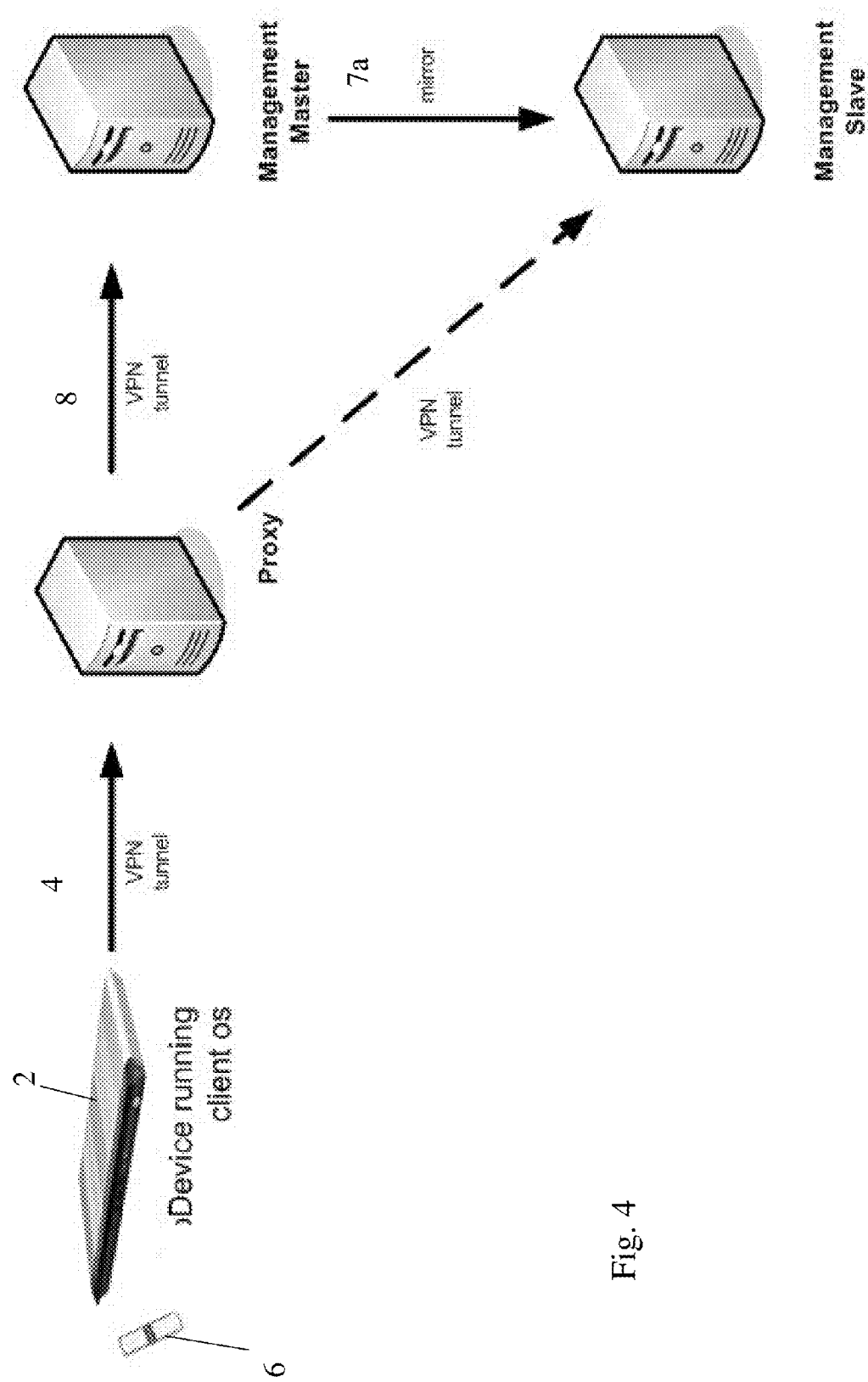
FIG. 4 shows a system with management for trusted distribution of content in accordance with an embodiment of the present invention.

High availability on the level of the management console means that there is only one master management system (see FIG. 4). All other activated management instances are slaves. One slave is enough to have high availability for the management console. The slave is a one-to-one mirror of the master management system.

Figure 5:
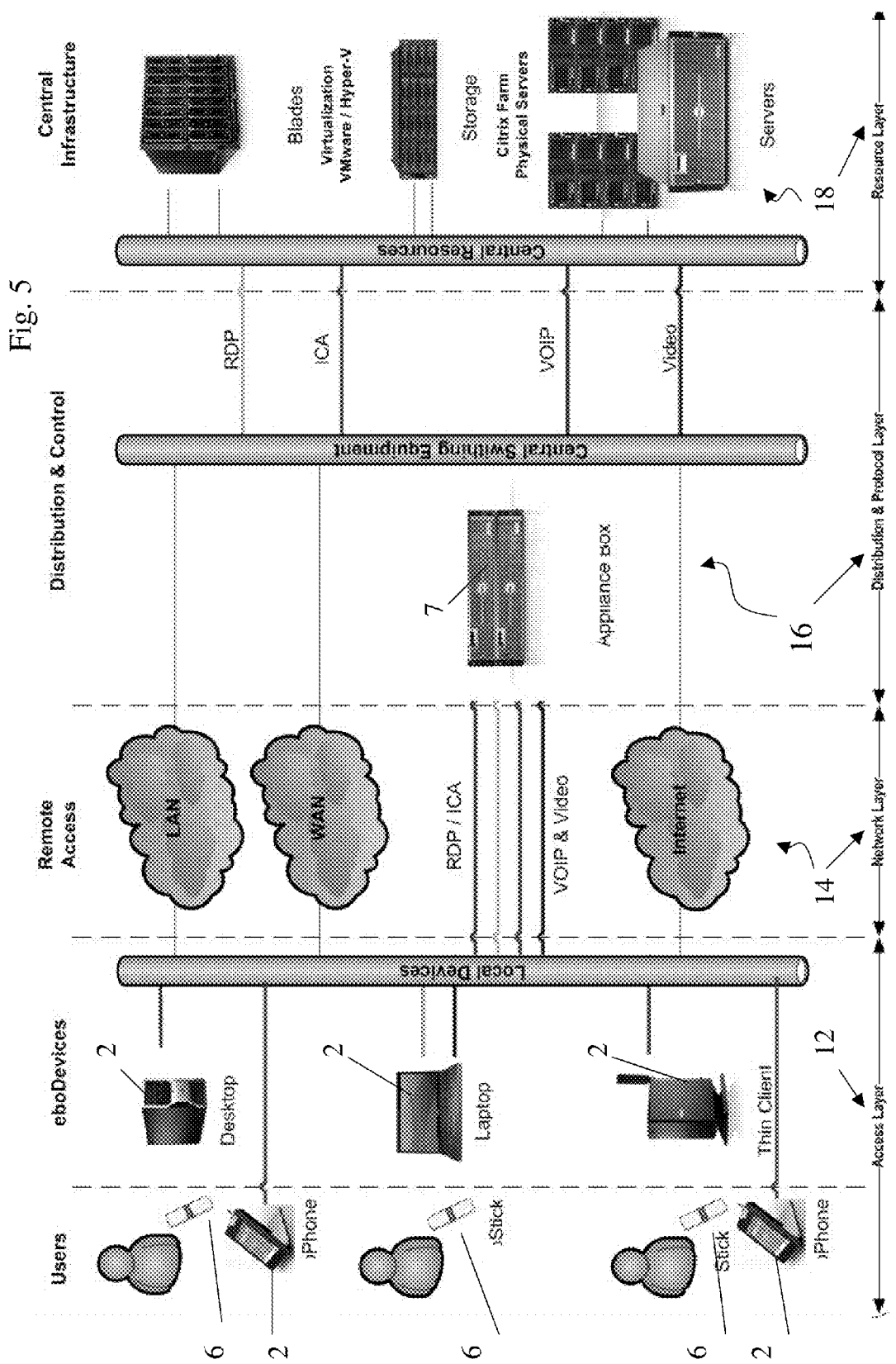
FIG. 5 shows a platform for trusted distribution of content in accordance with an embodiment of the present invention.

As shown in FIG. 5 the architecture is divided into several layers. In each layer, functionalities can elaborate without dependencies to another layer. This allows totally new functions to be implemented.

An access layer 12 is used by the user working on a client device/client hardware 2 which is booted with the client operating system 2a. A strong authentication medium such as a USB Identification Stick 6 can be used, but this can also fulfill the role of boot medium for the client operating system 2a. Authentication may be a separate function from the boot function. The user can work with one or more application environments. The client hardware devices 2 running the client operating system 2a are totally managed remotely through the central web-enabled management console in the appliance box 7. Any local end user preferences such as keyboard settings, monitor resolution and blanking is configured centrally. Even system actions such as reboot and power-off can be controlled and initiated through the central management console.

The advantage of this is that it is very difficult to interfere or access the system without the central management console being aware of such interference or access. Also the central management console has sufficient privileges that it can close or lock down any suspicious activity on the client device.

A network layer 14 can be divided into two types of networks: internal networks under control of the customer organization and external untrusted networks.

At startup of the Client operating system 2a expects a network address service such as provided by a dhcp service. The dhcp service can be for example an internal LAN or WAN service. If the connection is established via the Internet, then a router usually provides the dhcp service. After startup the Client operating system 2a will try to establish a secure tunnel such a VPN connection with the Proxy 7b which is residing centrally, e.g. in the appliance box 7, optionally in the data center. Protocols are supported to provide a secure connection such as the SSH protocol and the OpenVPN protocol. This means that each running Client operating system 2a secures a 'live' connection to the Proxy 7b. This happens both in internal networks, as in external untrusted networks. The networks may be cable or wireless networks.

Every byte or data stream from or to the Client operating system passes through the secure tunnel such as the VPN tunnel 4, 8 by default. There is only one exception in a LAN or WAN network. If it is possible to reach the centralized content via normal network routing, then a display session can be set up directly from the Client operating system to the centralized content. All other communication streams are passing through the secure tunnel such as the VPN tunnel, such as control and command messages, alerting, notification and system messages, all byte streams for the provisioning of printing and multimedia supporting protocols for USB and serial devices. A variety of display protocols (RDP, VNC, X, ICA, . . . ) can be used depending on the operating system of the application environment, the bandwidth and the type of information.

A control layer has a lot of functions and is actually the core of the system, which is accessible through the web-enabled management console. It offers the following services:

logical gateway for each running Client operating system
terminating or delegating client connections
network and security services
proxying & caching
protocol conversion
encryption and compression techniques
storage mappings between local devices and central application environments
supervises the active sessions The control layer 16 preferably comprises two components, a proxy 7b and a management component 7a. Both are residing in the Appliance Box 7. This is a host platform providing one management console, together with at least one proxy instance. The platform has built-in scalability since there is no limitation on the number of proxies.

Each proxy has to be registered in the management system before it can be used. This preferably happens automatically. There are no internal switches between the different proxy instances. This means that all IP traffic between the proxies and the management system happens outside of the Appliance Box 7. The customer's network infrastructure will handle this traffic: security and networking policies of the customer will be respected in case of vlan usage or Access Control Lists on core switch level.

Generally a proxy 7b acts as a distributor of traffic between the client devices 2 and the central application environments with all needed security measures and high availability services. While the management system acts as the single point of control for all data and business logic, the proxy 7b is the operational instance for all network and security services.

Between the proxy 7b and the management system a secure connection 8 is provided, e.g. the SSH and OpenVPN protocols are used. All data communication for control and status messages between the proxy 7b and the management system passes through the secure tunnel such as VPN tunnel 8 without any exception. Part of the overall management system is the management console, which is a web-enabled management interface for the whole system. All integrations with Active Directory or other third party vendors happens on the level of the management system.

The protocol layer 16 provides the remote access between a server as gateway for the client devices and the application environment. This layer can handle a variety of protocols at the same time, depending on the operating systems of the application environments and the needed security to the client device. Optionally supported protocols are: RDP, VNC, X, ICA and SSH for a variety of Windows and Linux operating systems.

A resource layer 18 is meant for resource provisioning because the content is centralized. The content can be a physical desktop provided by any suitable system such as with Windows XP, a VMware virtual machine, a physical Citrix server or Windows Terminal Server. Actually any IP device which provides a standard display protocol can be published as content to the end user. In the central data center there can be a mixture of solutions with physical and virtual infrastructure. It is the profiling of the organization which determines what the best solution is for a certain profile of users.

The management can integrate with several typical domain services like ldap, ntp and dns.

In different embodiments of the present invention different configurations can be provided. For example, in a LAN situation the client operating system connects to the centralized content directly, meaning a display protocol is setup directly to the content. In an Internet environment the client operating system will connect to the centralized content through the secured communication between the client operating system and the proxy. In this case the proxy must be able to connect to the centralized content using the appropriate display protocol.

Source TCP/UDP Port Protocol Destination

The client operating system is able to connect to a Proxy through a network. In embodiments of the present invention different configurations can be provided. In a LAN situation the client operating system connects to the centralized content directly, meaning a display protocol is setup directly to the content. In an Internet environment the client operating system will connect to the centralized content through the secured communication between the client operating system and the proxy.

Figure 6:
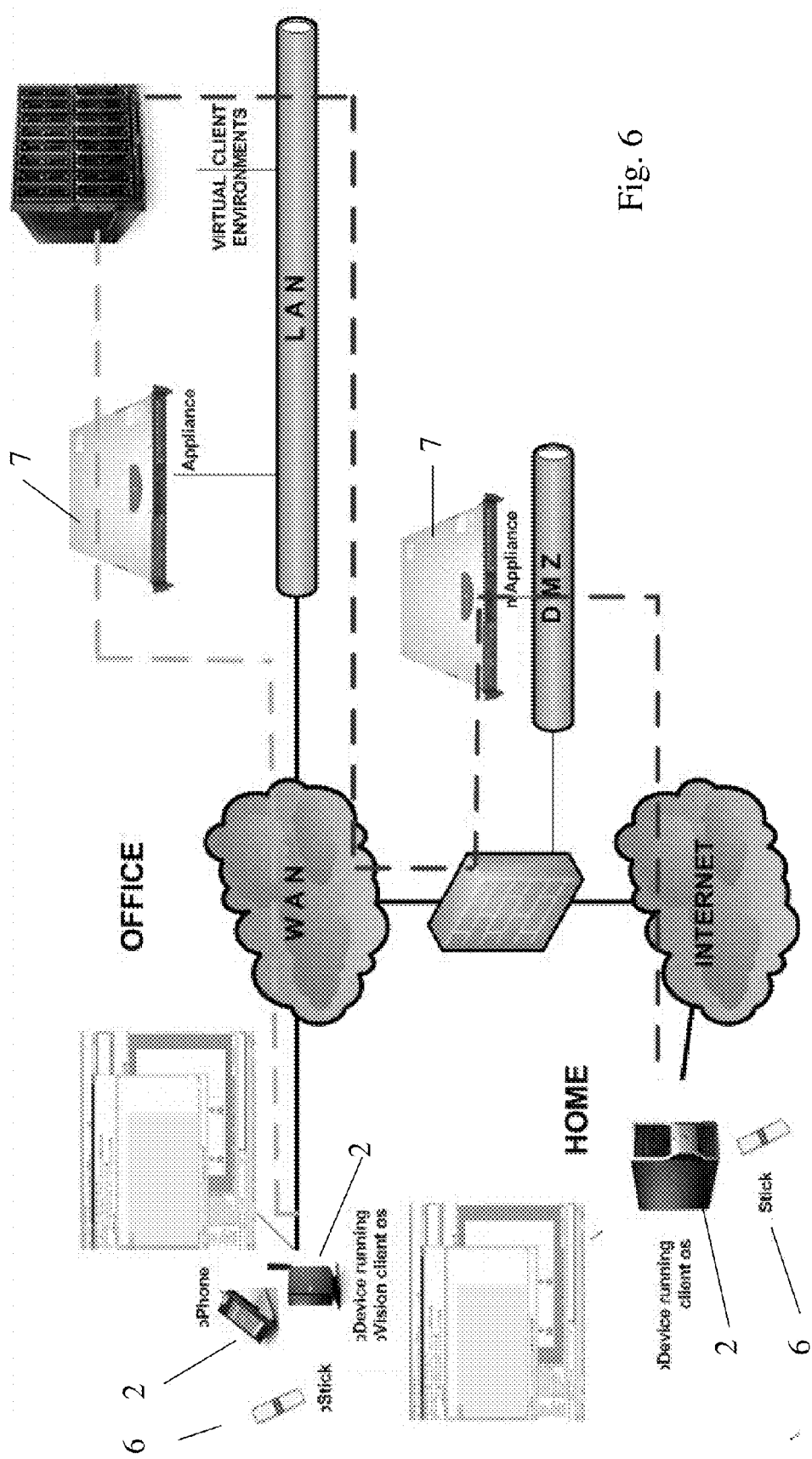
FIG. 6 shows another platform for trusted distribution of content in accordance with an embodiment of the present invention.

If the system is used to allow users from the Internet, then an Appliance Box is preferably placed in a DMZ (see FIG. 6).

Functional modules provide functionalities which are activated in the management console. One or more functional modules can be provided:

Functional Module Package Description

Identity Management Standard • supports the different authentication methods on user level Access Management Standard • supports the access rules on the level of client hardware Asset Management Standard • contains the state of all client hardware Brokering and Failover Standard • assigns content to users and failover environments Peripheral Interfaces Advanced • supports the mapping of usb, serial, audio ports Helpdesk & Ticketing Advanced • integrates a helpdesk and ticketing system Enhanced Support Tools Advanced • provides screen takeover, realtime monitoring and snmp events Homework Advanced • activates the ability to work from the Internet VMware Integration Additional • provides a very close integration with VMware VoIP (SIP) Additional • supports the usage of a sip phone to work with a voip centre SSO for applications Additional • extends the existing SSO on application level Virtual Classroom Additional • provides the ability for usage of educational services.

The platform is independent of the technological evolution in data centers, because it is a distribution platform for content. Outside the datacenter content is distributed. Only inside the data center application- and vendor specific software and data are provided. The present invention provides tools and equipment for the distribution of content towards an end user. The platform starts from a user centric design in which visualization of content is a service to the end user. Means for visualisation are one example of a human machine interface.

The Secured Content Distribution Platform provided by the present invention distributes any kind of content to authenticated endpoints. There can be multiple endpoints but one central component. Each local component exists of client hardware running a client operating system. The central component exists of appliance boxes running one or more proxies and one management console. The offered content resides behind the central component.

A trusted boot process loads the client operating system into memory of the client hardware. The whole client operating system is locked down on networking and security level with exception of a secured tunnel to the central component. This means that the centralized content cannot be compromised by local vulnerabilities. The present invention avoids a host operating system which is running VPN client software and the host operating system is not under control of the central vpn termination appliance or firewall. The client operating system resides either in a memory such as a flash memory of the client device or it resides on a memory such as a flash memory of a strong authentication medium such as a movable strong authentication medium like a usb stick.

This movable strong authentication medium such as a usb stick can be protected by hardware encryption, e.g. on the usb device itself.

The client operating system can be booted natively or virtually using a local virtualization tool like VMPlayer, VBox or others.

The client operating system incorporates:
all necessary network & security settings
    including full iptables functionality; only some specific
        ports are opened to the central system
all configuration settings are obtained from the central
    system
    including keyboard settings, monitor resolution, rights
        for using local peripheral equipment
all local user interactions are locked down
    there is no command line interface available for the end
        user; everything is controlled by the central system
        such as monitoring, logging, . . . .

The client operating system requires a certain memory space, e.g. 512 MB, for also storing the operating system into memory during the runtime operations.

Secured Connection to the Central Component

For setting up a secured connection to the central component a secure tunnel is preferably used of which an SSL VPN tunnel is only one example. All cryptographic primitives are used for a secured point-to-point connection from the local host to the central component. For example, a symmetric cipher such as AES512 and later can be used. For the integrity the system uses the message can use digest functions such as HMAC-SHA1 and following . . . SHA3. For fulfilling the asymmetric encryption, suitable keys and signatures can be used such as RSA keys and digital signatures.

Workstation Management

All human machine interactions involving human machine interfaces such as a graphic pointer such as a mouse and/or a keyboard, and/or screen presentation and/or voice communication are supported. The control of such interfaces is from the central management console. The presented content which is retrieved from the central information centre can be any suitable data, programs, video recordings, video streaming, voice recordings, audio files, phone functionality, graphics, an application program, a full operating system, etc. This content can be offered in multi functional ways, for example different overlaying sessions, multi-screen sessions, multi monitoring sessions, wide-screen support.

The concept of an information centre is applied. Other names used in the context of control rooms are operator console or workplaces. An information centre has preferably one operator and typically one or more monitors. The operator has for example one keyboard and mouse for all monitors. Each information centre can define a screen layout, meaning a symmetric composition of the monitor positioning. A screen layout incorporates a total number of screens which is divided in a number of rows and columns and where the orientation of the screen is determined. For example: 'Portrait Horizontal Octet' is 8 screens in 1 row and 8 columns, all screens in portrait mode; 'Landscape Rectangle Sextet' is 6 screens in 2 rows and 3 columns, all screens in landscape mode. Portrait and landscape modes can be combined in a screen layout.

Near the monitor positioning the allocation of the content over all screens needs to be defined. Multi-monitoring sessions are sessions where each session allocates one screen or monitor. Multi-screen sessions are sessions where each session allocates multiple monitors. A mixture of multi-monitoring and multi-screen sessions can be used in the same screen layout.

Identity & Access Management

Access control is handled in either a physical control and/or a logical control. A two step authentication is preferably used by default.

Physical access control means that the end user must have some identification medium with him to identify himself. The identification medium can be a hardware key carried by the end user or a biometric characteristic that the end user inherently owns. Hardware keys can be a movable strong authentication medium such as a usb stick with internal unique flash id, eID card, smartcard, token, proximity card, rf id, mobile phone with SIM card or any similar hardware identification medium. Biometrics can be voice recognition, finger printing, facial recognition, iris scan or any other biometric recognition feature which identifies an end user on a unique way. The physical access control is also know as a strong authentication method.

Logical access control is provided by the means of login credentials. These credentials are then validated by an authentication service. For example, openLDAP can be supported, and different authentication methods can be used like Microsoft active directory, eDirectory or Radius based authentication servers. The platform itself can also keep and validate credentials in combination with a default authentication method. Alternative authentication methods like pincode validation are also supported. The authentication service can be provided by a third party.

Single-Sign-On (SSO) can be provided in the logical access control method. Preferably, the end user needs to identify himself only once. After a positive authentication the system uses this credentials to login into the offered content on the information centre.

Physical and logical access control can be combined. The following can be used:

only physical access control and no logical control means that the user only needs a hardware key like an usb stick to obtain access to content, also described as 'automatic login'. This can be very useful in point of sales (POS) workstations.

physical access control and a limited logical control by validation of the password: after a positive physical validation the system has already identified the user and the SSO login box can be presented with predefined data like login and domain. The present invention includes other variations with predefined information in the fields login, password or domain.

no physical access control and only logical access control: in this case an empty SSO login box is presented.

Besides the combination of physical and logical access control, the addition of time constraints is preferred. Also a space constraint is a dimension which enables even more possibilities for user authentication.

The above authentication methods and systems can be described as advanced access control. However, more enhanced authentication can be used if physical access control is required, meaning that the authentication method evolves in time after a first positive validation. For example, an end user identifies himself by his identification medium and the SSO login box. After this first authentication the end user is allowed to use an alternative authentication method as logical access control mechanism limited in time. For instance after a first positive authentication:

the user identifies himself the following 8 hours by use of a pincode, or the user may omit the logical access control the following 4 hours.

These advanced authentication schemes can be used but preferably have time constraints by means of minutes, hours, days or day-schedules, week-schedules, month-schedules. The following scheme is possible, for example:

first authentication: physical access control and SSO login box following 2 days: automatic login can be used following 4 hours: pincode validation is active following 8 hours: only password validation The same user can also have different identification mediums. These mediums can be combined in the above authentication schemes. So each next step in the authentication time schedule can be differentiated by another identification medium. The above example can be extended by the following scheme, for example:

first authentication: physical access control by facial recognition and sso login box following 3 days:

authentication by hardware key such as a usb hardware key: automatic login can be used authentication by finger printing: predefined SSO login box following 8 hours:
   authentication by voice recognition: pincode validation
   authentication by a hardware key such as a usb hardware key: predefined SSO login box
following 4 hours: no authentication allowed
following 1 week:
   authentication by iris scan: only password validation
   authentication by smartcard: automatic login Elaborate and intelligent access control mechanisms can be built with the platform. The provision of superior authentication schemes can be required in some specific markets.

Client Device Authentication

The system needs preferably to know all used client hardware. This information is used by the central management console(s) to assist in authentication of users. For example, this can mean that an unique identifier must be known. This identifier can be for example, the MAC address, a service tag, a IPMI identifier or any unique value which can validate the uniqueness of the client device.

An autoregistration procedure is preferred for registering client hardware. This is only possible when an identification medium is used. In the central management an autoregistration counter is assigned to the identification medium which is coupled to an end user. The counter defines the number of times the end user may register new client hardware that is not formerly known before. If the counter is put to zero, then the end user will only be able to work on the defined client hardware in the system.

Once the client is defined in the system, then one or more identification methods can be activated. This provides the flexibility to define or allow the identification method on a client device.

Client Device

As client hardware any compatible device can be used, such as personal computers, workstations, laptops, notebooks, desktops, thin clients, zero clients or other embedded devices. For more specialized markets custom made industrial clients can be used to achieve a much higher security level. In such devices it is preferred that the client operating system is linked in a unique way to the physical client device.

The client must also define which peripheral interfaces can be used. Depending on the user and his rights as defined in the central system the peripheral interfaces like PCMCIA, usb, serial, parallel or audio ports can be made available.

All possible power management functions are preferably supported, such as Power over Ethernet (PoE).

Service Management on the Local Equipment

Since the client operating system really controls the client device, some services can be provided like remote shutdown/wakeup of the client device or taking over the screen of the end user. If the central supporting person can not only take over the screen of the end user but also other peripherals such as a mouse and/or a keyboard and an audio link to the end user is provided via a voice channel on the same client device, then the level of customer satisfaction can be increased greatly.

An operations console is also provided which can act immediately on a specific client device or end user. A command control channel is available in the central management console, the only interface that is needed to manage and control the platform.

On each running of a client operating system there is a state machine which reflects the situation of the client operating system. Each state change is replicated to the central component.

Local Applications

The client operating system preferably does not host other operating systems, virtual machines or other applications which can be loaded from a central platform. All functionality, tools and services come with and only with or are only loaded by the loaded client operating system with exception of some upgrades or patches.

In the client operating system there are some standard applications onboard which can be activated depending on the user rights as defined in the central component, but these applications are not downloaded and installed. They reside always in the client operating system. These local applications are, for example a VoIP application and/or a browser.

Offering the Content

In an embodiment of the present invention, a connection to the content can happen in two ways. The local client device can setup a session directly to the content. In this case the client devices resides on a trusted network. Even if the content can be retrieved directly from untrusted areas, the control of the session is till managed by the central system.

In the other case the session to the content passes via the secured tunnel to the central component which resides on a network of the customer such as on a LAN of the customer and from which the content can be accessed and directed through the secured tunnel. In this case all content connections are behind the central component and this happens typically when an unsecured network has to be passed.

Characteristics of the Central Data Center

Universal Brokering

One of the unique features in the system is the ability to abstract the content. Any kind of content can be offered to the enduser as long as the content has some presentation form to the enduser. This content can be data, applications, voice, video content or any other content form. The system provides brokering on multi media content and channels.

The content typically resides in a server room or a datacentre.

On the level of data and application content all operating systems which are IP addressable are supported, like Microsoft, Linux and Macintosh environments.

The content offering to the enduser can also exist of different simultaneous content sessions.

The user can have a number of sessions which are displayed on a number of displays. The same content session can also be visualized on multiple displays, meaning the displays are performing together as one screen. The position of the displays may also differ between landscape and portrait mode. Both rotations are supported in as well multimonitoring sessions as multi display sessions. Means for visualisation are one example of a human machine interface.

One of the most differentiating features of the present invention is the ability to assign content to an enduser depending on different criteria. One of these criteria is the identification method. One identification medium is assigned to one user. One user can have multiple identification mediums. A user which identifies himself only with a loginbox and no physical access control can be assigned another environment than the same user which identifies himself with a hardware key.

Another criterion is the client hardware on which the user identifies himself. The same user with the same identification medium can be assigned another content depending on the client device on which the user identifies himself. Actually any rule between the user and the device and the content can be defined. In this sense you can position the system as a kind of semantic content firewall. This can be very useful in situations like the following:

Every user known in the system which identifies himself on a specific client running the client operating system, will get the same environment X This content can only be accessed by these specific clients The above criteria combined with a timing and space constraint is a management benefit. So the user will get a specific content depending on the identification medium he uses, the client device on which he identifies himself, the time and time zone.

Monitoring

In the management console there is an integrated synoptic board which reflects all current events and actions in real time. Also archiving is foreseen to interrogate all logged events in the last timeframe. Questions like 'who is working on which device?', 'who has worked yesterday on that device?' or 'who is accessing this content?' are standard requests which can be answered instantly.

Scalability

The platform has built-in scalability meaning that one appliance box can be adopted to handle a large number users.

The invention claimed is:

1. A method for providing for a user a secure connection between a first electronic device and a second electronic device over a communication network that may be insecure and that connects the first and second electronic devices, the secure connection being used for exchanging data while executing an application, comprising the steps of:
   providing a first electronic device that comprises:
      memory, storing user identification information;
      a human machine interface associated with the first electronic device; and
      at least one communication port;
      said first electronic device being a zero client,
   providing a second electronic device configured to store, control,
   and execute all applications running while the first and second electronic devices are connected, and storage of all data used with the applications, and administrating the secure connection;
   providing a third electronic device comprising:
      memory, storing user identification information; and
      an initialization module;
   connecting the first electronic device with the third electronic device via the communication port;
   initializing and managing by said third electronic device operation of the first electronic device for setting-up a secure connection over said communication network with the second electronic device by a trusted boot process that boots an operating system in a random access memory of the first electronic device;
   managing every interface of the first electronic device and the secure connection from the second electronic device, the managing comprising administrating the secure connection by the second electronic device by receiving over the secured connection the user identification information and based thereon authenticate the user, the administrating including allowing or denying access to data and/or applications stored on the second electronic device based on the security settings of the authenticated user, and
   executing the application on the second electronic device while exchanging the data over the secure connection for presentation to the user via the human machine interface of the first electronic device.

2. The method of claim 1, further comprising executing for a user an application over the secure connection between the first electronic device and the second electronic device over the communication network, connecting the first and second electronic devices, the secure connection being used for exchanging data while executing the application, the method comprising the step of:
   establishing the secure connection in accordance with the method of claim 1.

3. The method of claim 1, after establishing the secure connection, further comprising the step of:
   executing the application under the control of the second electronic device while exchanging the content over the secure connection for presentation to the user via the human machine interface of the first electronic device.

4. A trusted content distribution system for providing for a user a secure connection between a first electronic device and a second electronic device over a communication network that connects the first and second electronic
   devices, the secure connection being used for exchanging data, said first electronic device comprising:
      memory, storing user identification information;
      a human machine interface associated with the first electronic device; and
      at least one communication port;
   said first electronic device being a zero client,
   whereby said second electronic device is configured to store and execute all applications running while the first and second electronic devices are connected, store all data used with the applications, and administer the secure connection; and
   whereby a third electronic device is used, the third electronic device comprising:
      memory, storing user identification information;
      and an initialization module;
   whereby the at least one communication port is configured to connect the first electronic device with the third electronic device;
   the system further comprising:
   means for initializing and managing by said third electronic device the operation of the first electronic device for setting-up a secure connection over said communication network with the second electronic device, the means for initializing being a trusted boot process that boots an operating system in a random access memory of the first electronic device;
   means for managing every interface of the first electronic device and the secure connection from the second electronic device, the managing comprising administrating the secure connection by the second electronic device by receiving over the secure connection the user identification information and based thereon authenticate the user, the administrating including allowing or denying access to data and/or applications stored on the second electronic device based on the security settings of the authenticated user; and
   means for executing the application on the second electronic device while exchanging the data over the secure connection for presentation to the user via the human machine interface of the first electronic device.

5. The trusted content distribution system of claim 4 wherein the means for managing comprises an appliance box communicating with the first electronic device device over a secure tunnel.

6. The trusted content distribution system of claim 5, wherein the appliance box comprises a proxy component and a management component.

7. The trusted content distribution system of claim 5, wherein the appliance box is provided with any of network connectivity, Support and Maintenance at boot time, and a Web-enabled Management Console.

8. The trusted content distribution system of claim 4, wherein the first electronic device is configured to provide one or more authentication mechanisms to access content that is centralized on the communication network, or
wherein the first electronic device is configured to use one or both logical and physical access control.

9. The trusted content distribution system of claim 4 wherein a client operating system runs either natively or virtually on the first electronic device.

10. The trusted content distribution system of claim 4 wherein the first electronic device is configured for Single Sign-On.

11. The trusted content distribution system of claim 4 wherein the first electronic device is configured to use a strong authentication medium.

12. The trusted content distribution system of claim 4, wherein the means for initializing is a trusted boot process that boots an operating system in a random access memory of the first electronic device.

13. The trusted content distribution system of claim 4, wherein the first electronic device is configured to receive over the secure connection the user identification information and based thereon to authenticate the user, the means for managing every interface being configured to allow or deny access to data and/or applications under the control of the second electronic device based on security settings of the authenticated user.

14. The trusted content distribution system of claim 4, wherein the second electronic device is configured to control execution of an application while exchanging content over the secure connection for presentation to the user via the human machine interface of the first electronic device.

15. A bootable user specific electronic device comprising:
memory, storing user identification information; a communications port and an initialization module;
the user specific electronic device having means for initializing and managing operation of a further electronic device for setting-up a secure connection over a communication network with a third electronic device for trusted content distribution using a secure connection between the further electronic device and the third electronic device, the secure connection being used for exchanging data, the means for initializing being a trusted boot process that boots an operating system in a random access memory of the first electronic device, said further electronic device being a zero client device and comprising:
a human machine interface associated with the further electronic device; the communications port being configured to connect the user specific electronic device to the further electronic device, the initialization module being configured to install an operating system on the further electronic device that allows managing of every interface of the further electronic device from the third electronic device via the secure connection, the managing comprising administrating the secure connection by the third electronic device by receiving over the secure connection the user identification information and based thereon authenticate the user, the administrating includes allowing or denying access to data and/or applications stored on the user specific electronic device based on the security settings of the authenticated user, and
executing the application on the third electronic device while exchanging the data over the secure connection for presentation to the user via the human machine interface of the further electronic device.

* * * * *